United States Patent [19]
Sakakibara et al.

[11] Patent Number: 6,074,326
[45] Date of Patent: Jun. 13, 2000

[54] LOCK-UP CONTROL SYSTEM FOR VEHICLE DRIVETRAIN WITH TORQUE CONVERTER

[75] Inventors: Satoshi Sakakibara; Akihiro Ueki, both of Kanagawa, Japan

[73] Assignee: Nissan Motor Co., Ltd., Yokohama, Japan

[21] Appl. No.: 09/258,279

[22] Filed: Feb. 26, 1999

[30] Foreign Application Priority Data

Feb. 27, 1998 [JP] Japan .................................... 10-046772

[51] Int. Cl.[7] .................................................. F16H 61/14
[52] U.S. Cl. ........................ 477/169; 477/175; 477/904; 192/3.31
[58] Field of Search ............... 192/3.31; 477/64, 477/169, 175, 904, 62, 65

[56] References Cited

U.S. PATENT DOCUMENTS

| | | | |
|---|---|---|---|
| 4,499,979 | 2/1985 | Suzuki et al. ............................ | 192/3.31 |
| 4,687,083 | 8/1987 | Sotoyama et al. ....................... | 477/169 |
| 4,730,709 | 3/1988 | Kawata et al. .......................... | 192/3.31 |
| 5,616,099 | 4/1997 | Sakai ....................................... | 477/169 |
| 5,697,866 | 12/1997 | Okahara ................................... | 477/169 |

FOREIGN PATENT DOCUMENTS 4-370465   12/1992   Japan .

*Primary Examiner*—Sherry L. Estremsky
*Attorney, Agent, or Firm*—Foley & Lardner

[57] ABSTRACT

An engine-transmission drivetrain includes a torque converter situated between the engine output shaft and the transmission. The torque converter includes a lock-up clutch. A speed sensor, which measures the rotational speed of an output shaft of the transmission, generates a pulse signal. A transmission controller includes a deceleration dependent lock-up release command generator and a torque converter speed dependent lock-up release command generator. The pulse signal from the speed sensor is used as inputs to both of the lock-up release generators. In the deceleration dependent lock-up release command generator, the pulse signal is processed to derive information as to the magnitude of deceleration which the transmission output shaft is subject to. In the torque converter speed dependent lock-up release generator, the pulse signal is processed to derive information as to rotational speed of an output element of the torque converter. At deceleration with the magnitude of deceleration greater than or equal to a predetermined reference, the deceleration dependent lock-up release generator gains authority over the lock-up release control. At deceleration with the magnitude of deceleration less than the predetermined reference, the torque converter speed dependent lock-up release generator gains authority over the lock-up release control.

21 Claims, 8 Drawing Sheets

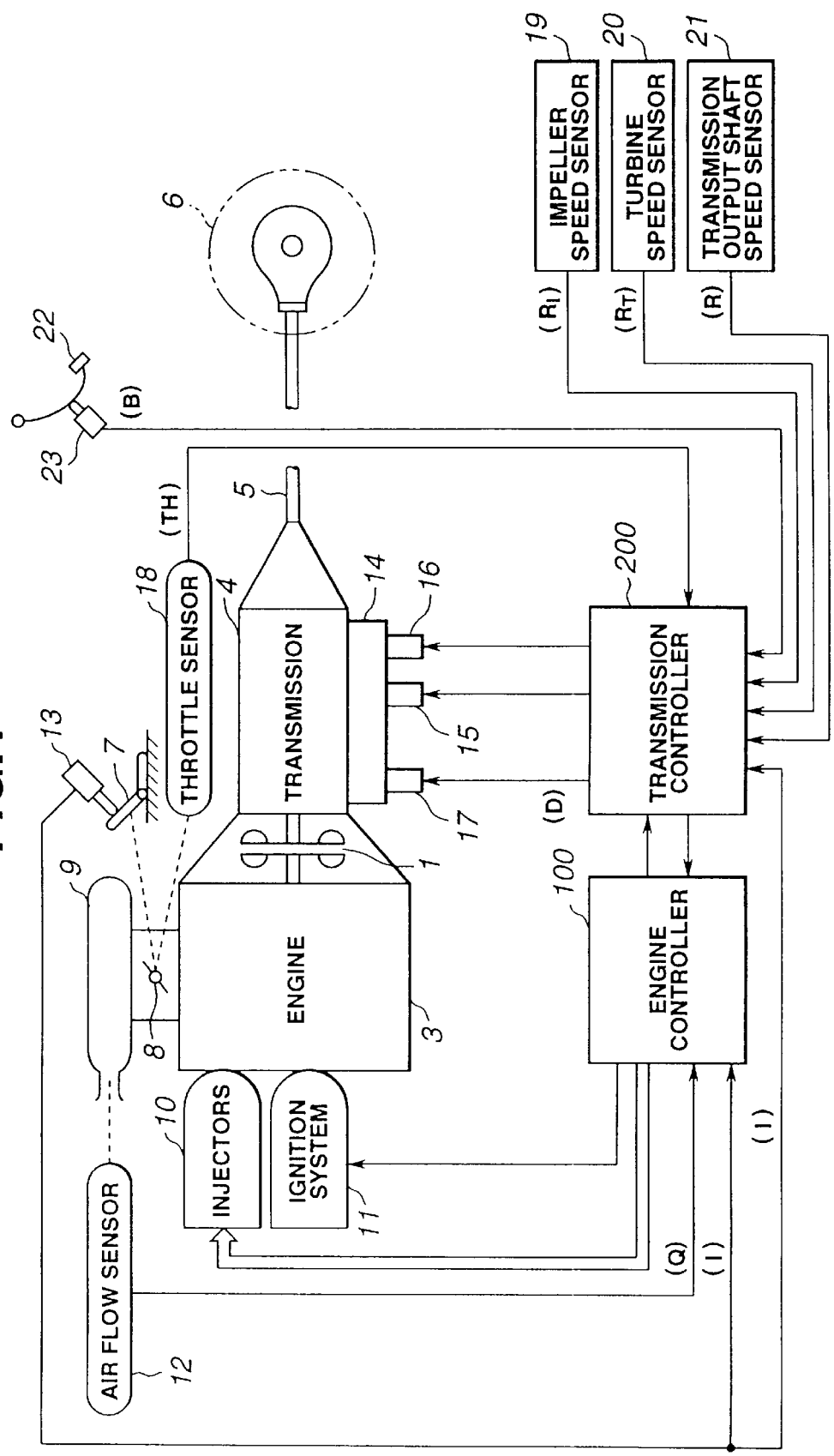

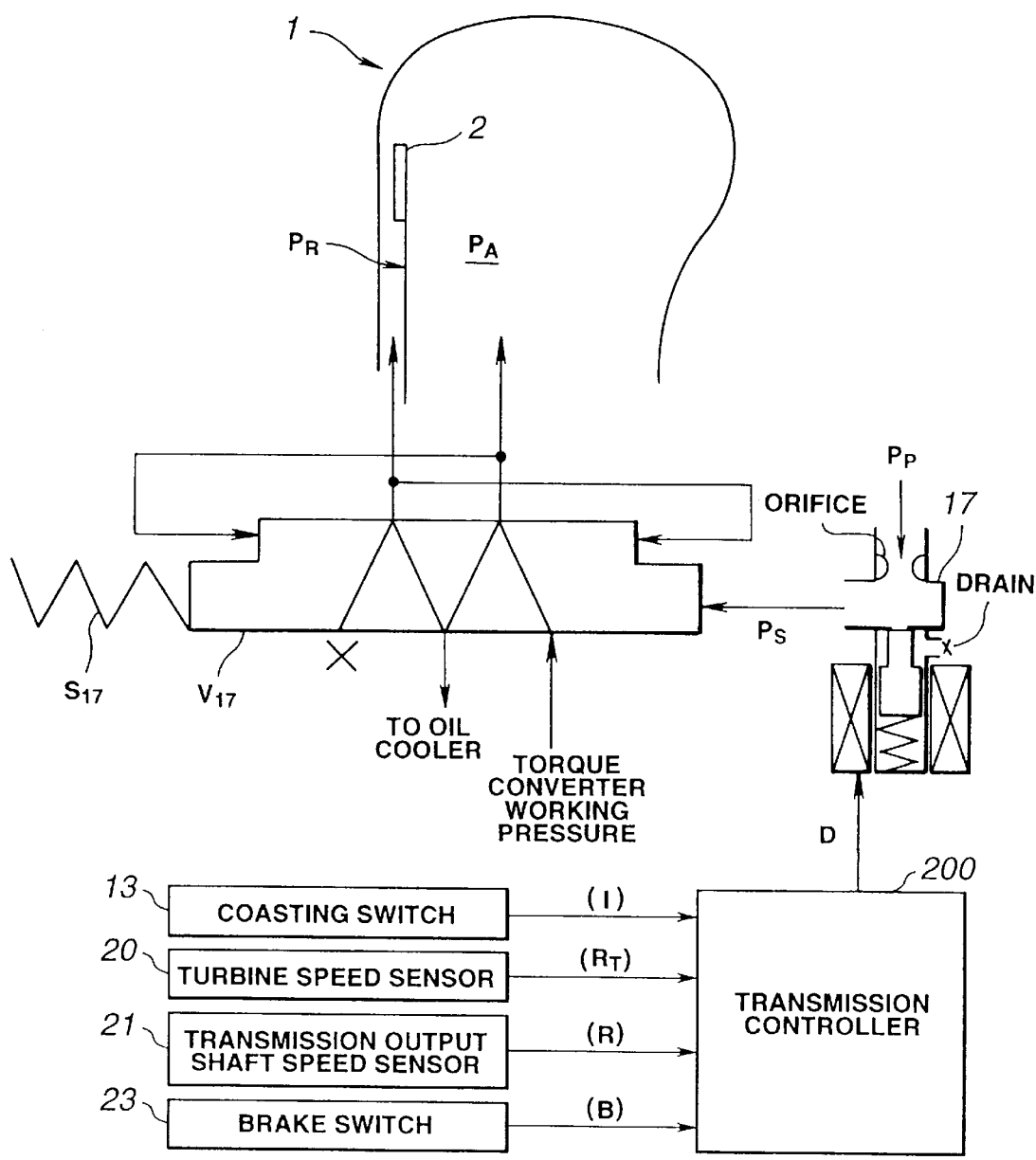

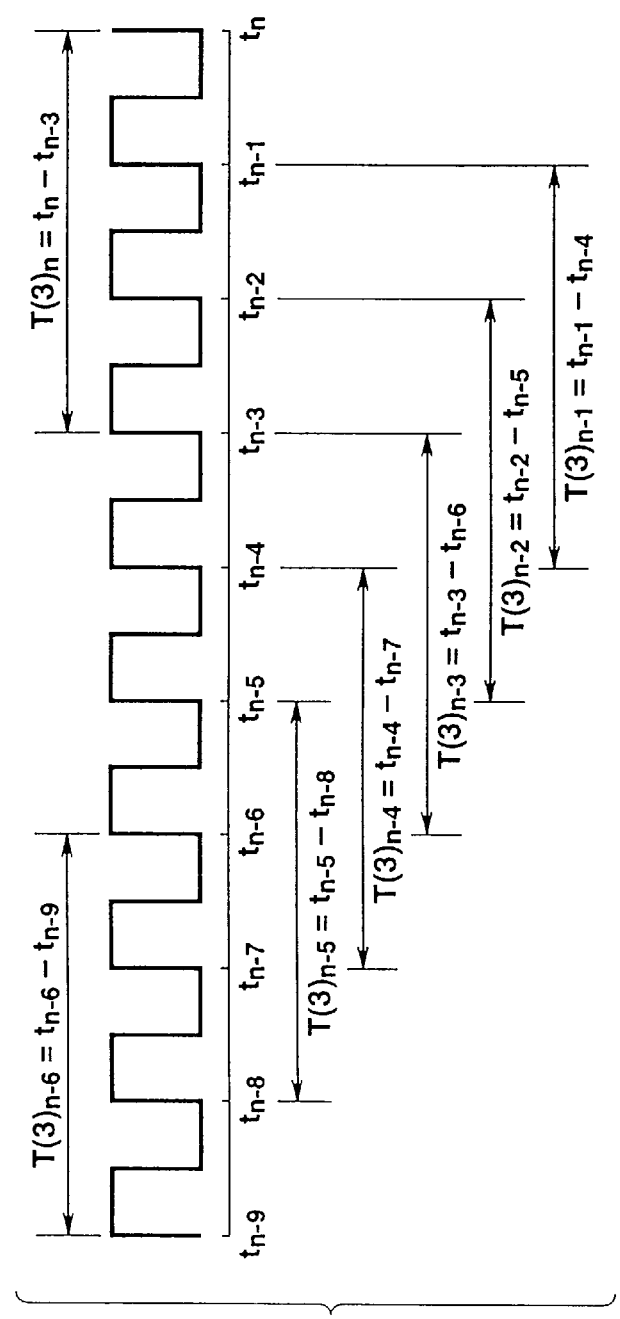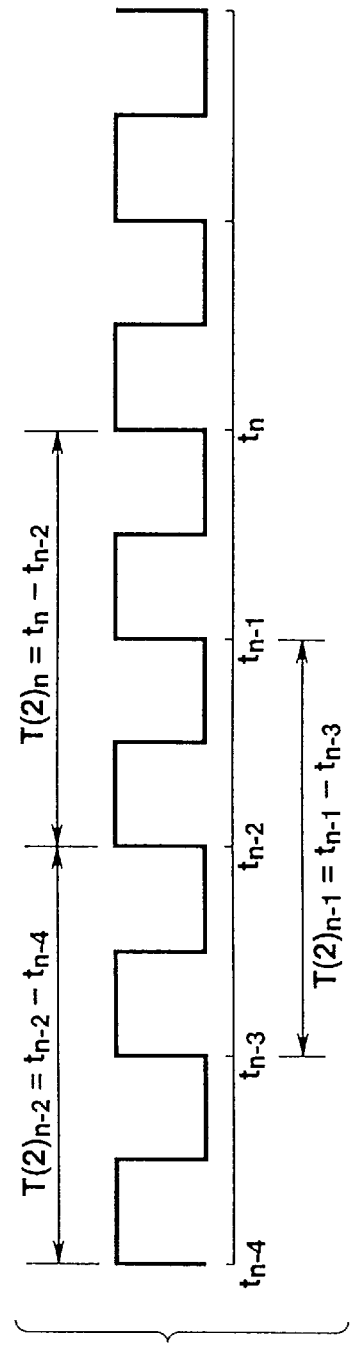
FIG.3(a)
FIG.3(b)

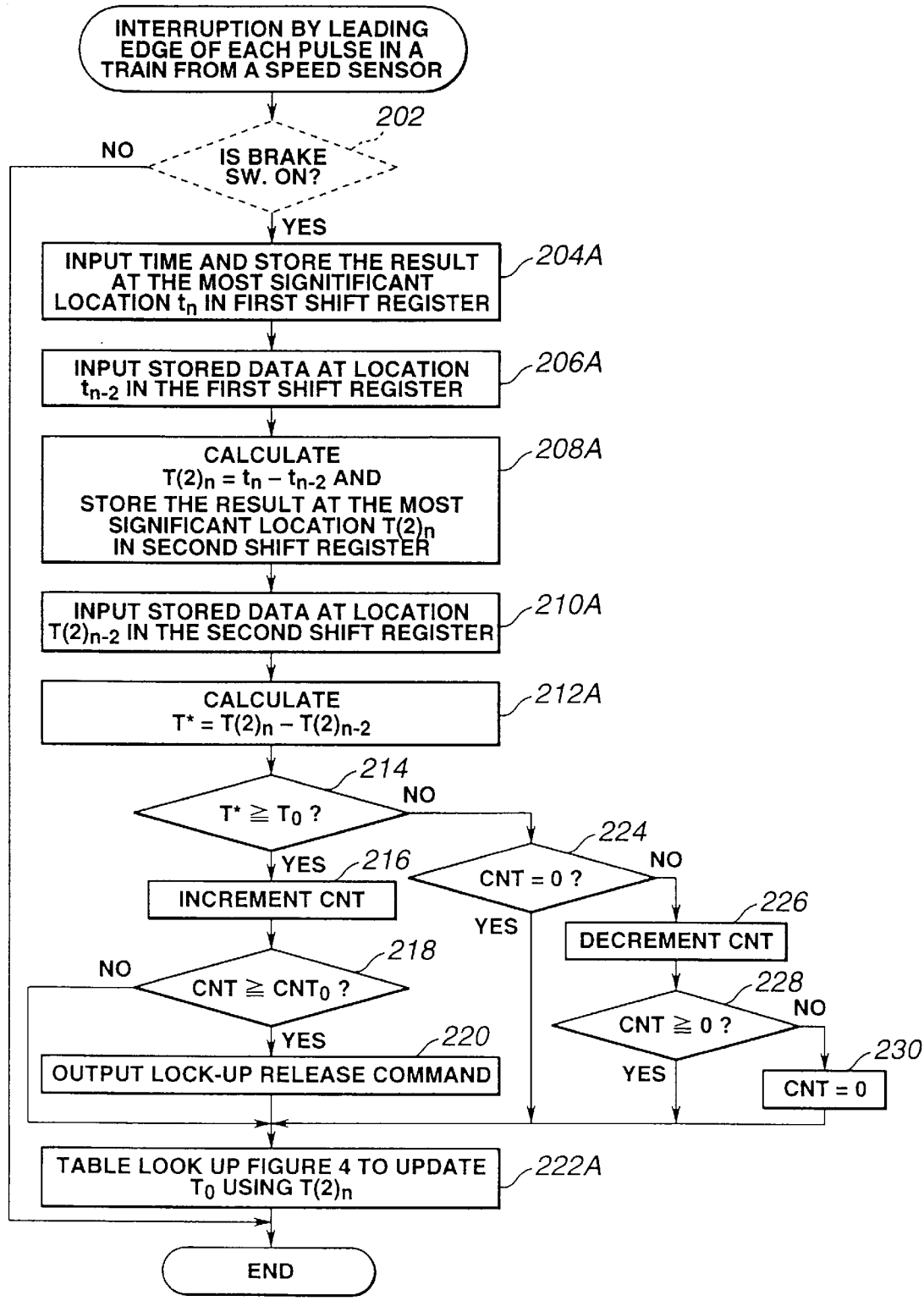

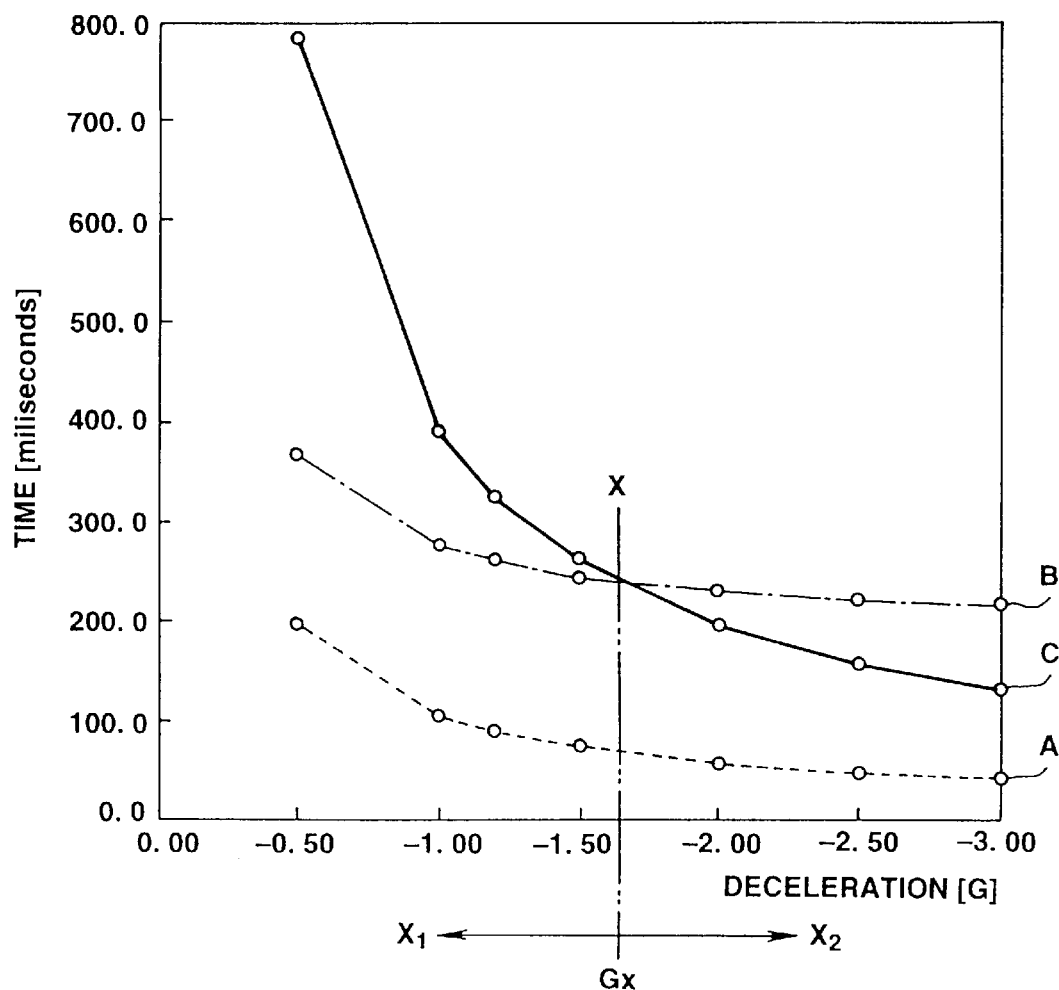

6,074,326

LOCK-UP CONTROL SYSTEM FOR VEHICLE DRIVETRAIN WITH TORQUE CONVERTER

FIELD OF THE INVENTION

The present invention relates to a vehicle drivetrain including a torque converter situated between an engine and an automatic transmission, and particularly to a lock-up control system for the drivetrain.

BACKGROUND OF THE INVENTION

In a vehicle drivetrain, a torque converter is situated between an engine and an automatic transmission. The automatic transmission may be in the form of a continuously variable transmission (CVT). A lock-up clutch is included in the torque converter to interconnect an input element and an output element of the torque converter. A lock-up control arrangement includes a lock-up control valve and a lock-up solenoid whose duty is variable under the control of a transmission controller.

At rapid deceleration, it is needed to release the engagement of the lock-up clutch well before the engine stalls. The transmission controller generates a lock-up release command and the lock-up control arrangement triggers movement of the lock-up control valve to a lock-up release position in response to the lock-up command.

JP-A 4-370465 teaches releasing the lock-up clutch in response to deceleration, which the transmission output shaft is subject to at rapid deceleration. When the magnitude of deceleration becomes greater than a predetermined reference, the transmission controller generates a lock-up release command.

An object of the present invention is to provide a lock-up control system for a vehicle drivetrain, which can generate a lock-up release command at deceleration with any magnitude of deceleration out of a range over all of available magnitudes of deceleration.

SUMMARY OF THE INVENTION

If the known teaching is employed to accomplish the above-mentioned object, it is found necessary to set the predetermined reference to a value low enough to cope with all available deceleration events. Setting the predetermined reference to such a low value increases the probability that the predetermined reference may be exceeded due mainly to external disturbance because a pulse signal of a speed sensor is processed to determine instantaneous magnitude of deceleration. This might cause undesired release of lock-up clutch to resume fuel supply where the fuel-cut operation is needed.

The present invention aims at eliminating this problem.

According to the present invention, there is provided a lock-up control system for a vehicle drivetrain with a foot brake pedal and a torque converter situated between an engine and a transmission, the torque converter having an input element connected to the engine and an output element as a torque delivery element to the transmission, the transmission having torque delivery elements including an output shaft, the lock-up control system comprising:

a lock-up clutch operative to interconnect the input and output elements of the torque converter when engaged;

a lock-up clutch control arrangement operative to release said lock-up clutch in response to a lock-up release command;

a deceleration dependent lock-up release command generator operative to develop said lock-up release command in response to the magnitude of deceleration, which one of the torque delivery elements of the transmission is subject to; and a torque converter speed dependent second lock-up release command generator operative to develop said lock-up release command in response to rotational speed of the output element of the torque converter.

BRIEF DESCRIPTION OF THE DRAWINGS

FIG. 1 is a block diagram showing the relationship between controllers, sensors, a torque converter in a vehicle drivetrain.

FIG. 2 is a simplified illustration of a lock-up clutch control arrangement.

FIGS. 3(a) and 3(b) are a train of pulses of a pulse signal of a speed sensor.

FIG. 6 is a flow diagram illustrating a modified control routine of the deceleration dependent lock-up release command generator.

FIG. 9 illustrates results of a tensing conducted to evaluate the torque converter speed dependent lock-up release command generator.

DESCRIPTION OF THE PREFERRED EMBODIMENT

Figure 4:
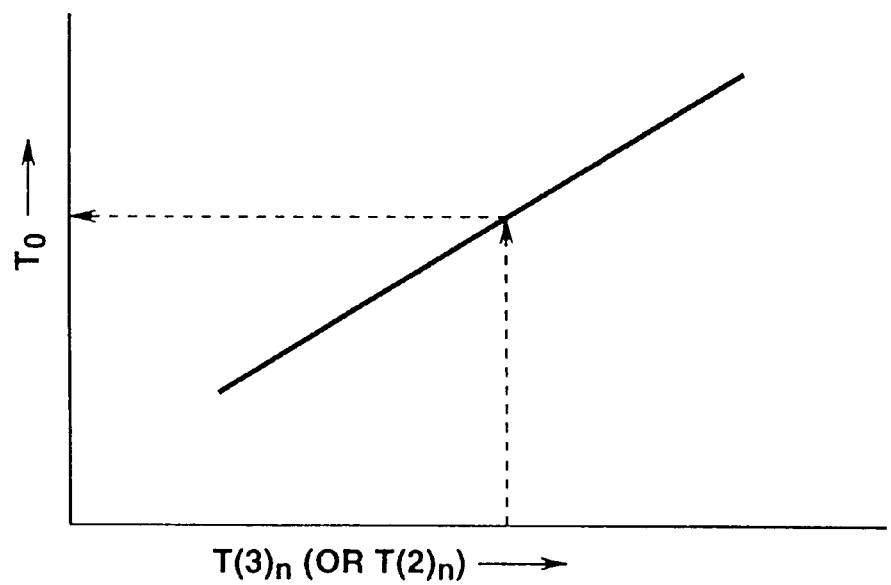
FIG. 4 illustrates the relationship between various values of a predetermined reference against various magnitudes of calculated deceleration stored in a look-up table in a controller memory.

Referring to the accompanying drawings, a torque converter lock-up clutch control system is described.

FIG. 1 is a simplified illustration of a vehicle drivetrain including a torque converter 1 situated between an internal combustion engine 3 and an automatic transmission 4. The torque converter 1 includes, as an input element, a pump impeller connected to an output shaft of the engine 3 and, as an output element, a turbine runner connected to a turbine shaft. The turbine shaft serves as an input shaft of the transmission 4. The transmission 4 includes an output shaft 5 drivingly connected to the vehicle driving wheels 6. The engine torque is transmitted to the pump impeller. The pump impeller accelerates oil inside of the torque converter 1 towards the turbine runner and the oil at the turbine exit is redirected over a stator into the pump impeller, thereby achieving a torque multiplication effect. The torque is delivered by torque delivery elements of the transmission 4 to the transmission output shaft 5. The transmission 4 includes ratio control means operative to establish various speed ratios between the input shaft and the output shaft 5. The transmission 4 may be a continuously variable transmission (CVT). The CVT is described in U.S. Pat. No. 5,697,866 issued to Okahara and assigned to the assignee of the present application, which U.S. Pat. No. 5,697,866 is hereby incorporated by reference in its entirety. The transmission 4 may be a multiple discrete ratio transmission, in which two shift solenoids are activated or deactivated to trigger movement of shift valves to establish a plurality of speed ratios between the input and output shafts.

The engine 3 has a throttle valve 8, which opens in degrees in response to manual depression of an accelerator or gas pedal 7 by an operator. The engine 3 draws in air via an air cleaner 9 at a flow rate that is determined by the throttle opening degree and the engine speed. The engine 3 has fuel injectors 10 arranged for cylinders, respectively, and an ignition system 11. A microprocessor based engine controller 100 controls the fuel injectors 10 and the ignition system 11. The engine controller 100 inputs information based on a sensor signal Q from an air flow sensor 12 and a signal I from a coasting switch 13. The air flow sensor 12 detects intake air flow admitted to the engine cylinders and generates the sensor signal indicative of the detected intake air flow. The coasting switch 13 is positioned adjacent the accelerator pedal 7. The coasting switch 13 is normally turned off and turned on only when the accelerator pedal 7 is released. Thus, the signal I is at a high level when the coasting switch 13 is turned on and a low level when it is turned off.

The engine controller 100 processes the input information and determines the fuel quantity for injection by each of the injectors 10 into the corresponding one cylinder in accordance with various operating conditions of the engine 3. The engine controller 100 has a fuel cut control strategy. According to the fuel cut control strategy, the engine controller suspends supply of fuel to the injectors 10 for driving in coast. Based on the various kinds of information, the engine controller 100 adjustably controls the ignition timing for generation of a spark at each spark plug by the ignition system 11 in response to various operating conditions of the engine 3. Thus, the combustion within each of the engine cylinders is optimized in response to the engine various operating conditions, and the fuel cut operation is conducted in a predetermined manner during driving in coast. In response to a drop in engine speed below a predetermined level during the fuel cut operation, the engine controller 100 restores fuel supply to the engine cylinders, thereby to avoid engine stall.

The transmission 4 includes a hydraulic control valve assembly 14. Where the transmission 4 is in the form of a CVT, the hydraulic control valve assembly includes a first solenoid 15, a second solenoid 16 and a lock-up solenoid 17.

The first solenoid 15, namely a pressure modifier solenoid, generates signal pressure applied to a pressure modifier valve. Duty of the pressure modifier solenoid 15 is adjusted to alter the magnitude of the signal pressure. The pressure modifier valve generates modifier pressure variable in response to the signal pressure. The modifier pressure is applied to a line pressure regulator valve. The line pressure regulator valve generates line pressure variable in response to the modifier pressure.

The second solenoid 16, namely a clutch solenoid, cooperates with a forward clutch control valve and a reverse brake control valve. The forward clutch control valve controls oil pressure established within a forward clutch in response to signal pressure generated by the clutch solenoid. The reverse brake control valve oil pressure established within a reverse brake. The forward clutch serves as a torque delivery element to establish a forward torque delivery path for forward drive through a forward/reverse changeover mechanism that is situated between a CVT unit and the torque converter 1. The reverse brake serves as a torque reaction element to establish a reverse torque delivery path for reverse drive through the forward/reverse changeover mechanism. Duty of the clutch solenoid 16 is adjusted to alter the magnitude of the signal pressure applied to the forward clutch and reverse brake control valves.

The lock-up solenoid 17 cooperates with a lock-up control valve. The above-mentioned solenoids and valves are described in the incorporated U.S. Pat. No. 5,697,866.

Where the transmission 4 is a multiple discrete ratio transmission, a hydraulic control valve assembly includes two shift solenoids 15 and 16 in addition to a lock-up solenoid 17. When it is activated, each of the solenoids 15 and 16 triggers movement of its associated shift valve in the control valve assembly 14 between upshift and downshift positions.

The torque converter 1 includes a lock-up clutch 2. Altering duty of the lock-up solenoid 17 controls the engagement of the lock-up clutch 2. Within a lock-up region when the torque multiplication and torque variation absorption are not demanded on the torque converter 1, the lock-up clutch 2 is engaged. Outside of the lock-up region, the lock-up clutch 2 is released. Engagement of the lock-up clutch 2 causes the torque converter 1 to take a lock-up state in which the input and output elements are interconnected. Release of the lock-up clutch 2 causes the torque converter 1 to take a converter state in which torque multiplication and torque variation absorption effects are provided.

Referring to FIG. 1, a transmission controller 200 controls the solenoids 15, 16 and the duty D of the lock-up solenoid 17. The transmission controller 200 inputs information based on signal I from the coasting switch 13, a throttle position signal TH from a throttle sensor 18, a pulse signal $R_I$ from an impeller speed sensor 19, a pulse signal $R_T$ from a turbine speed sensor 20, a pulse signal R from an output shaft speed sensor 21, and a signal B from a brake switch 23. The throttle sensor 18 detects the opening degree of the throttle valve 8 and generates throttle position signal TH indicative of the detected throttle opening degrees. The impeller speed sensor 19 detects the rotational speed $N_I$ of the input element of the torque converter 1 and generates pulse signal $R_I$ variable with the detected speed $N_I$. The turbine speed sensor 20 detects the rotational speed $N_T$ of the input element in the form of a turbine shaft of the torque converter 1 and generates pulse signal $R_T$ variable with the speed $N_T$. The output shaft speed sensor 21, which may be called a vehicle speed sensor, detects the rotational speed $N_O$ of the output shaft 5 and generates pulse signal R variable in with the detected speed $N_O$. The brake switch 23 is turned on when a foot brake pedal 22 is depressed and generates signal B, which becomes a high level upon depression of the brake pedal 22.

The transmission controller 200 processes the input information and conducts a ratio control in accordance with a shift schedule. The transmission controller 200 inputs information as to the throttle opening degree and vehicle speed from throttle position signal TH and pulse signal R in performing a table look-up operation of a table data to give an appropriate speed ratio for current operating condition. To alter speed ratio established in the transmission 4, the transmission controller 200 alters a ratio control actuator command. In response to the ratio control actuator command, the ratio control means establish various speed ratios between the input and output shaft if the transmission 4 is the CVT. If the transmission 4 is the multiple ratio discrete transmission, the shift solenoids 15 and 16 are activated or deactivated in response to the ratio control actuator command to conditions the associated shift valves.

Based on the various kinds of input information, the transmission controller 200 determines whether or not the operation of the torque converter 1 in the lock-up range is required and alters the duty of the lock-up solenoid 17. Adjusting the duty of the lock-up solenoid 17 conditions the torque converter 1 in the lock-up state by engaging the lock-up clutch 2 in the lock-up range.

During a shift from the lock-up state toward the converter state, the transmission controller 200 gradually alters the duty D of the lock-up solenoid 17 to establish gradual progress into the torque converter state.

FIG. 2 is a simplified illustration of a lock-up control system. The lock-up capacity or torque requirement on the lock-up clutch 2 is altered to establish between the torque converter input and output elements direct drive connection, hydraulic drive connection, and transient states. A deviation of lock-up clutch release pressure $P_R$ from lock-up clutch apply pressure $P_A$ determines the lock-up capacity.

This deviation ($P_A$-$P_R$) is less than a first predetermined value when the lock-up capacity is low enough to allow release of the mechanical engagement between the input and output elements of the torque converter 1 to establish the hydraulic drive connection (converter state). The deviation ($P_A$-$P_R$) is greater than a second predetermined value that is greater than the first predetermined value when the lock-up capacity high enough to allow mechanical engagement between the input and output elements of the torque converter 1 to establish the direct drive connection (lock-up state).

A lock-up control valve $V_{17}$ is illustrated in diagram. This lock-up control valve is described in the incorporated U.S. Pat. No. 5,697,866. Positioning the lock-up control valve $V_{17}$ at various positions determines the deviation ($P_A$-$P_R$). The lock-up control valve $V_{17}$ is subject to a lock-up clutch apply pressure $P_A$, a bias force due to a spring $S_{17}$ for movement in one direction. Further, it is subject to a lock-up clutch release pressure $P_R$ and a pressure Ps generated by the lock-up solenoid 17 for movement in the opposite direction.

Referring to FIGS. 3(a), 3(b), 4 and 7, the preferred implementation of the present invention is described. This implementation includes a speed sensor arranged to measure rotational speed of a torque delivery element situated between the torque converter 1 and the vehicle driving wheels 6. The transmission output shaft 5 and the turbine shaft are examples of the torque delivery element.

According to the preferred implementation of the present invention, the pulse signal R from the speed sensor 21 (see FIG. 1) is used as an input to a deceleration dependent lock-up release command generator and also to a torque converter speed dependent lock-up release command generator.

At rapid deceleration initiated by depression of foot brake pedal 22, the deceleration dependent lock-up release command generator is triggered to determine the current magnitude of deceleration, which the output shaft 5 is subject to. The deceleration dependent lock-up release command generator repeats calculation of a period T(3)n or T(2)n. Referring to FIG. 3(a), the period T(3)n is the time from the start $t_n$ of one pulse to the start $t_{n-3}$ of two before the last pulse in a train of the pulse signal. Referring to FIG. 3(b), the period T(2)n is the time from the start $t_n$ of one pulse to the start $t_{n-2}$ of one before the last pulse in a train of the pulse signal. The calculated values of the period T(3)n or T(2)n are used in estimating the current magnitude of deceleration, which the transmission output shaft 5 is subject to. The deceleration dependent lock-up release command generator calculates a difference T* by subtracting from the calculated value T(3)n of one period the calculated value T(3)n–6 of five before the last period in a train as shown in FIG. 3(a). Alternatively, the difference T* may be calculated by subtracting from the calculated value T(2)n of one period the calculated value T(2)n–2 of one before the last period in a train as shown in FIG. 3(b).

The deceleration dependent lock-up release command generator determines whether or not the calculated value of the difference T* is greater than a reference $T_0$. The reference $T_0$ is updated whenever the calculation of the period T(3)n or T(2)n has been made. The interrogation is repeated whenever the calculation of the difference T* has been made.

The deceleration dependent lock-up release command generator includes a counter CNT that is subject to increment whenever it is determined that the calculated value of the difference T* is greater than or equal to the reference $T_0$. When the counter CNT becomes equal to or greater than a predetermined number $CNT_0$, the deceleration dependent lock-up release command generator develops a deceleration dependent lock-up release command. The counter CNT is subject to decrement whenever it is determined that the calculated value of the difference T* is less than the predetermined number $CNT_0$.

The deceleration dependent lock-up release command generator includes a look-up table containing various values of the reference $T_0$ against various values of the period T(3)n or T(2)n as illustrated in FIG. 4. The deceleration dependent lock-up release command generator performs a table look-up operation of FIG. 4 whenever the calculation of the value of the period T(3)n or T(2)n is made to determine the value of the reference $T_0$ for the newly calculated value of the period T(3)n or T(2)n.

Figure 7:
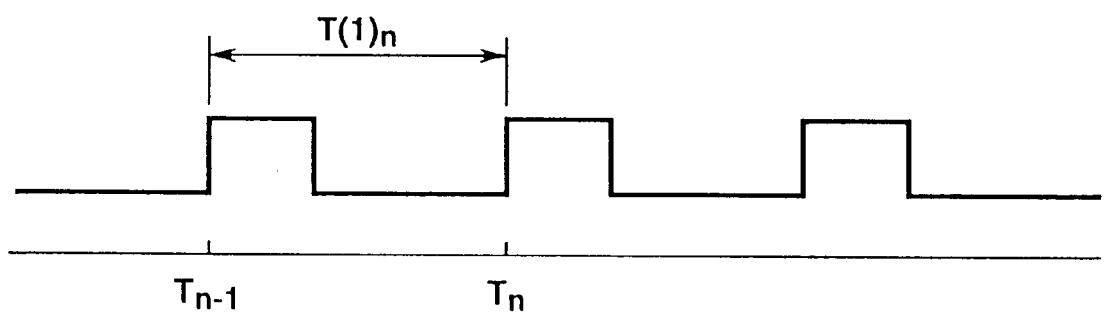
FIG. 7 is the train of pulses of the pulse signal of the speed sensor.

At rapid deceleration initiated by depression of foot brake pedal 22 to turn the brake switch 23 on, the torque converter speed dependent lock-up release command generator is triggered to determine the current magnitude of rotational speed of the output shaft 5. The torque converter speed dependent lock-up release command generator repeats calculation of a period T(1)n. Referring to FIG. 7, the period T(1)n is the time from the start $t_n$ of one pulse to the start $t_{n-1}$ of the last pulse in a train of the pulse signal R from the speed sensor 21. The calculated value of the period T(1)n is used in estimating a period Ttn. The period Ttn is the time from the start of one pulse to the start of the last pulse in a train of the pulse signal $R_T$ from the turbine speed sensor 20 (see FIG. 1). The turbine speed sensor 20 is arranged to measure the rotational speed of the output element of the torque converter 1. This estimation can be carried out using a current speed ratio i established in the transmission by calculating the formula Ttn=T(1)n/i.

The pulse signal from the turbine speed sensor 20 may be used as the input to the torque converter speed dependent lock-up release command generator. In this case, the above-mentioned estimation process is not needed.

The deceleration dependent lock-up release command generator determines whether or not the period Ttn is greater than or equal to a reference $Tt_0$. The interrogation is repeated whenever the calculation of the period Ttn has been made.

The torque converter speed dependent lock-up release command generator includes a counter N that is subject to increment whenever it is determined that the calculated value of the period Ttn is greater than or equal to the reference $Tt_0$. When the counter N becomes equal to or greater than a predetermined number n, the torque converter speed dependent lock-up release command generator develops a torque converter speed dependent lock-up release command. The counter N is cleared whenever it is determined that the calculated value of the difference Ttn is less than the predetermined number n.

FIG. 9 shows results of testing that was conducted to evaluate the performance of the torque converter speed dependent lock-up release command generator under different deceleration conditions with different magnitudes of deceleration. Under each of the different deceleration conditions, the time was measured from the start of application of the foot brake pedal 22 to the completion of increasing the content of counter N by the predetermined number n. These measurement results are plotted and interconnected by the broken line A in FIG. 9. Under each of the different deceleration conditions, the time was measured from the start of application of the foot brake 22 to the release of the lock-up clutch 1. These measurement results are plotted and interconnected by one-dot chain line B in FIG. 9. Under each of the different deceleration conditions, the time was measured from the start of application of the foot brake pedal 22 to the instance when the turbine speed $N_T$ has been forced to drop down to a predetermined speed at which the engine will stall. These measurement results are plotted and interconnected by the fully drawn line C in FIG. 9. Comparing the one-dot chain line B with the fully drawn line C reveals that the torque converter speed dependent lock-up release command generator can release the lock-up clutch 1 before the engine stalls if the magnitude of deceleration is less than $G_x$. In FIG. 9, the two-dot chain line X indicating GX divides the horizontal axis where various magnitudes of deceleration are arranged into two regions. The first region extends from the two-dot chain line X in the direction of an arrow $X_1$. The second region extends from the two-dot chain line X in the direction of an arrow $X_2$. Accordingly, the torque converter speed dependent lock-up release command generator should gain authority over the lock-up release in the first region $X_1$ of deceleration, while the deceleration dependent lock-up release generator should gain authority over the lock-up release in the second region $X_2$ of deceleration. The setting of the magnitudes of reference $T_0$ are set sufficiently high enough for the deceleration dependent lock-up release command generator to gain authority over the lock-up release in the second region $X_2$ of deceleration.

Figure 5:
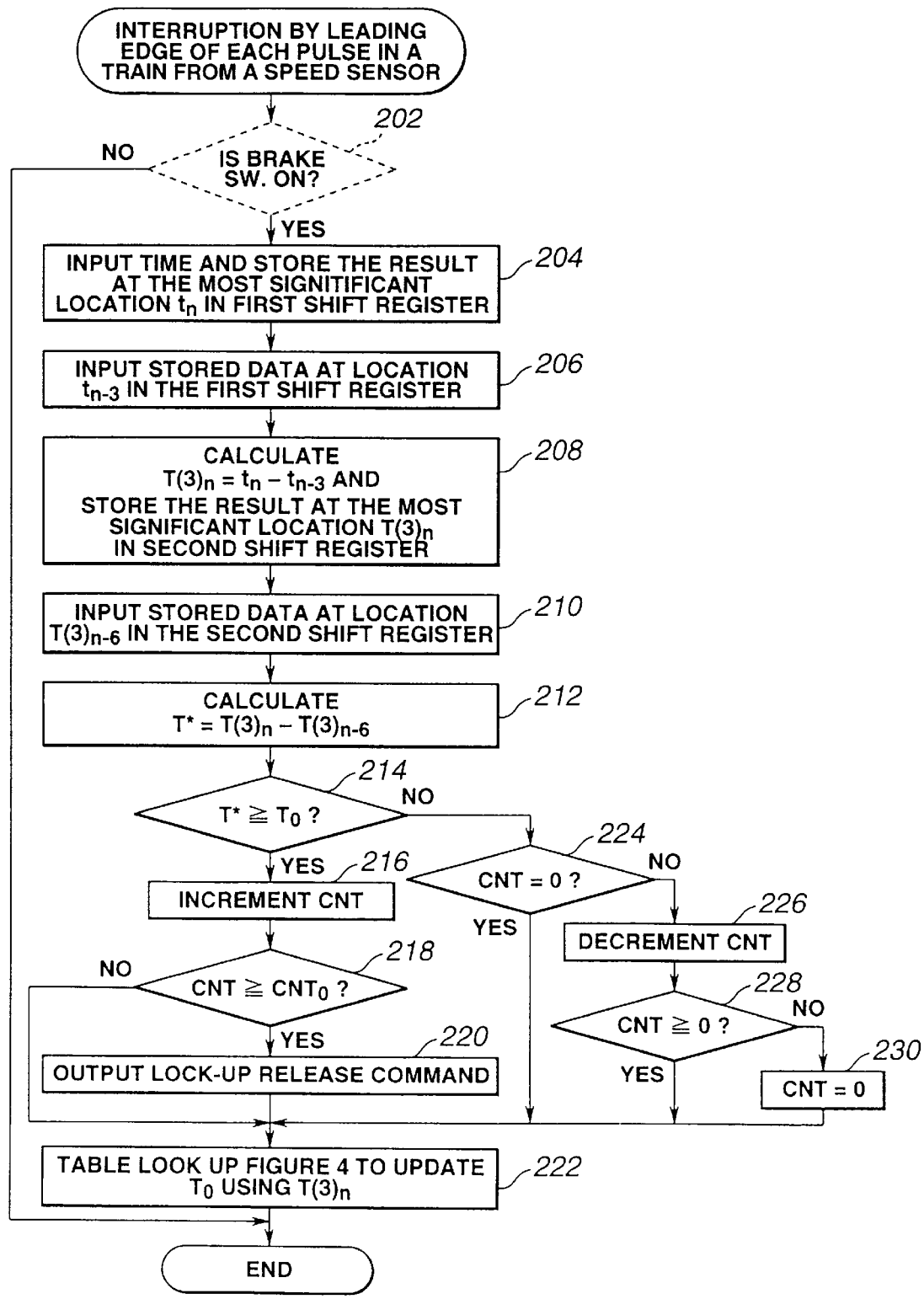
FIG. 5 is a flow diagram illustrating a control routine of the deceleration dependent lock-up release command generator.

The flow diagram of FIG. 5 illustrates a deceleration dependent lock-up release control routine of the preferred implementation of the present invention. Interruption by the leading edge or the start of each pulse in a train of the pulse signal R of the speed sensor 21 initiates execution of this control routine.

At an interrogation step 202, the transmission controller 200 determines whether or not the input information from the brake signal B indicates that the brake switch 23 is turned on. If the interrogation at step 202 results in negative, the control routine comes to an end. If the interrogation at step 202 results in affirmative, the control routine proceeds to the next step 204. The provision of this interrogation step 202 is advantageous in saving the time required for execution of the routine while the foot brake 22 is not depressed and the brake switch 23 is turned off. If desired, this interrogation step 202 may be removed from the control routine.

In the next step 204, the transmission controller 200 inputs time to determine the start of a current pulse $t_n$ in a train of the pulse signal R, see FIG. 3(a), and stores the result at the most significant location, namely $t_n$, in a first shift register. The first shift register has, in addition to the most significant location $t_n$, three less significant locations, namely $t_{n-1}$, $t_{n-2}$ and $t_{n-3}$ and can shift to the right in the direction from the most significant location $t_n$ toward the least significant location $t_{n-3}$. Storing new data into the most significant location $t_n$ causes movement of the stored data to the adjacent locations and causes the stored data at the least significant location $t_{n-3}$ to overflow.

In step 206, the transmission controller 200 inputs the stored data at the location $t_{n-3}$ in the first shift register. In step 208, the transmission controller 200 subtracts the input data $t_{n-3}$ from the input data $t_n$ to store the result at the most significant location, namely T(3)n, in a second shift register. The second shift register has, in addition to the most significant location T(3)n, six less significant locations, namely T(3)n−1, T(3)n−2, T(3)n−3, T(3)n−4, T(3)n−5 and T(3)n−6, and can shift to the right in the direction from the most significant location T(3)n toward the least significant location T(3)n−6 Storing new data into the most significant location T(3)n causes movement of the stored data to the adjacent locations and causes the stored data at the least significant location T(3)n−6 to overflow.

In step 210, the transmission controller 200 inputs the stored data at the location T(3)n−6 in the second shift register. In step 212, the transmission controller 200 subtracts the input data T(3)n−6 from the input data T(3)n to store the result as T*.

In interrogation step 214, the transmission controller 200 determines whether or not the data T* is greater than or equal to a reference $T_0$. If the interrogation in step 214 results in affirmative, the routine proceeds to step 216. If the interrogation in step 214 results in negative, the routine proceeds to another interrogation step 224.

In step 216, the transmission controller 200 increases the content of counter CNT by one. In the next interrogation step 218, the transmission controller 200 determines whether or not the content of counter CNT is greater than or equal to a predetermined number $CNT_0$. If the interrogation in step 218 results in affirmative, the transmission controller 200 outputs a lock-up release command in step 220. In the next step 222, the transmission controller 200 performs a table look-up operation of FIG. 4 using the data T(3)n to update the reference $T_0$. If the interrogation in step 218 results in negative, the routine proceeds to step 222 for the transmission controller 200 to update the reference $T_0$.

The transmission controller 200 decreases the content of counter CNT by one if the interrogation in step 214 results in negative. If the interrogation in step 214 is negative, the transmission controller 200 determines, in step 224, whether or not the content of counter CNT is equal to zero. If, in step 224, the content of the counter CNT is zero, the control routine proceeds to step 222. If, in step 224, the content of counter CNT is not equal to zero, the transmission controller 200 decreases, in step 226, the content of counter CNT by one. In the next interrogation step 228, the transmission controller 200 determines whether or not the content of counter CNT is greater than or equal to zero. If the interrogation in step 228 results in affirmative, the routine proceeds to step 222. If the interrogation in step 228 results in negative, the transmission controller 200 sets the content of counter CNT equal to zero. After step 230, the routine proceeds to step 222. The routine comes to an end after performing the table look-up operation in step 222.

From the preceding description, it is understood that the data T* is proportional to the magnitude of deceleration, which the output shaft 5 is subject to.

The steps 214, 216, 218 and 220 clearly indicates that the output of lock-up release command is prevented until the content of counter CNT becomes equal to or greater than the predetermined number $CNT_0$. This arrangement is effective in preventing the output of lock-up release command caused due to error in detecting the magnitude of deceleration induced by the external disturbance derived from lag in the drivetrain and/or irregular road surface.

The flow diagram of FIG. 6 illustrates a modification of the control routine illustrated in FIG. 5. The modified control routine of FIG. 6 is substantially the same as the control routine of FIG. 5 except the provision of modified steps 204A, 206A, 208A, 210A, 212A and 222A instead of the steps 204, 206, 208, 210, 212 and 222.

In FIG. 6, in step 204A, the transmission controller 200 inputs time to determine the start of a current pulse $t_n$ in a train of the pulse signal R, see FIG. 3(b), and stores the result at the most significant location, namely $t_n$, in a first shift register. The first shift register has, in addition to the most significant location $t_n$, two less significant locations, namely $t_{n-1}$, and $t_{n-2}$ and can shift to the right in the direction from the most significant location $t_n$ toward the least significant location $t_{n-2}$. Storing new data into the most significant location $t_n$ causes movement of the stored data to the adjacent locations and causes the stored data at the least significant location $t_{n-2}$ to overflow.

In step 206A, the transmission controller 200 inputs the stored data at the location $t_{n-2}$ in the first shift register. In step 208A, the transmission controller 200 subtracts the input data $t_{n-2}$ from the input data $t_n$ to store the result at the most significant location, namely T(2)n, in a second shift register. The second shift register has, in addition to the most significant location T(2)n, two less significant locations, namely T(2)n-1 and T(2)n-2, and can shift to the right in the direction from the most significant location T(2)n toward the least significant location T(2)n-2 Storing new data into the most significant location T(2)n causes movement of the stored data to the adjacent locations and causes the stored data at the least significant location T(2)n-2 to overflow.

In step 210A, the transmission controller 200 inputs the stored data at the location T(2)n-2 in the second shift register. In step 212A, the transmission controller 200 subtracts the input data T(2)n-2 from the input data T(2)n to store the result as T*.

The routine proceeds to steps 214, 216, 218 and 220. After step 220, 224, 228 or 230, the routine proceeds to step 222A. In step 222A, the transmission controller 200 performs a table look-up operation of FIG. 4 using the data T(2)n to update the reference $T_0$.

Figure 8:
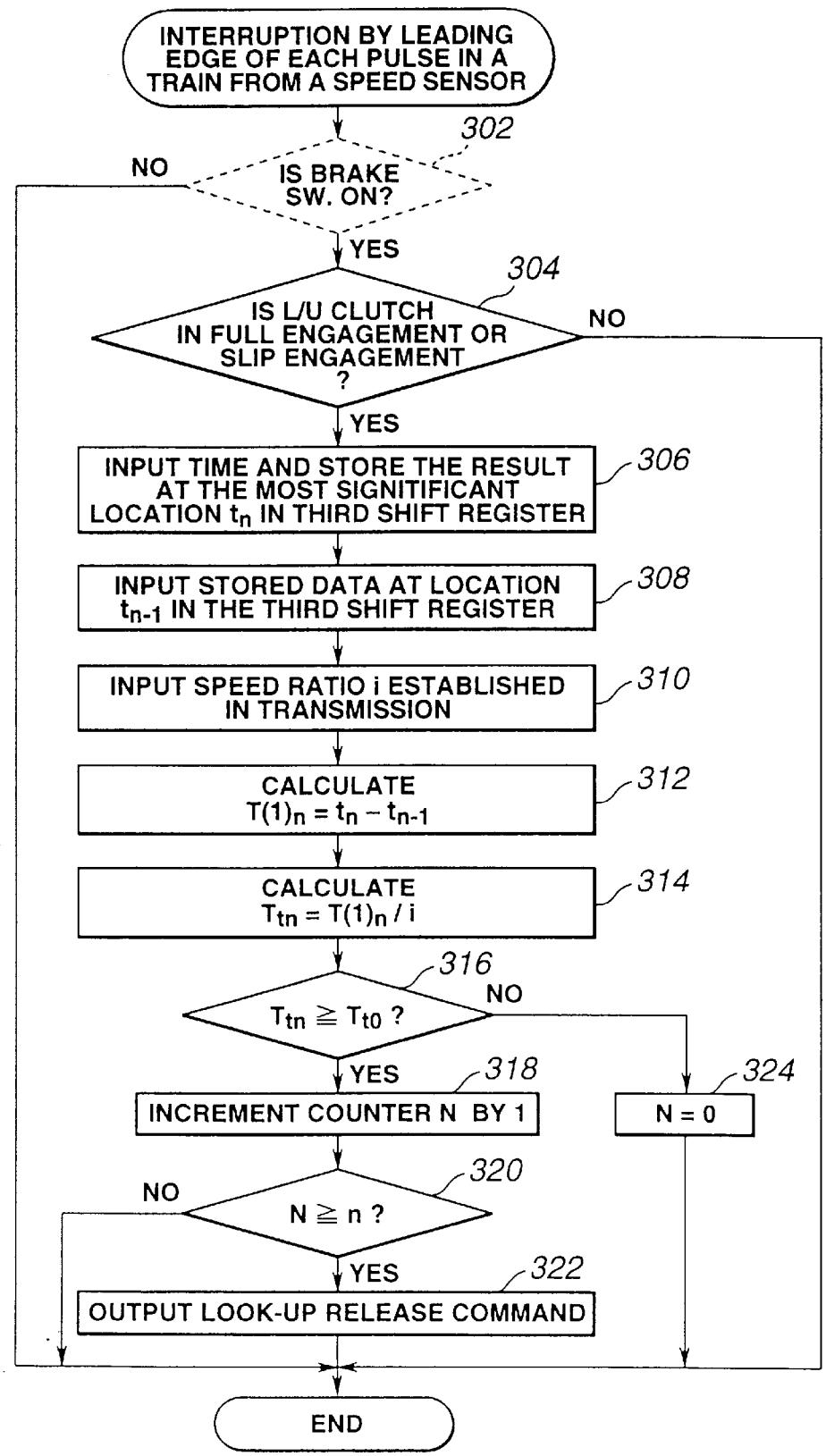
FIG. 8 is a flow diagram illustrating a control routine of the torque converter speed dependent lock-up release command generator.

The flow diagram of FIG. 8 illustrates a torque converter speed dependent lock-up release control routine of the preferred implementation of the present invention. Interruption by the leading edge or the start of each pulse in a train of the pulse signal R of the speed sensor 21 initiates execution of this control routine.

At an interrogation step 302, the transmission controller 200 determines whether or not the input information from the brake signal B indicates that the brake switch 23 is turned on. If the interrogation at step 302 results in negative, the control routine comes to an end. If the interrogation at step 302 results in affirmative, the control routine proceeds to the next step 304. The provision of this interrogation step 202 is advantageous in saving the time required for execution of the routine while the foot brake pedal 22 is not depressed and the brake switch 23 is turned off. If desired, this interrogation step 302 may be removed from the control routine.

At the next interrogation step 302, the transmission controller 200 determines whether or not the lock-up clutch 1 is in full engagement or in slip engagement after inputting information as to the duty D of the lock-up solenoid. If the interrogation in step 304 results in affirmative, the routine proceeds to step 306. If the interrogation in step 304 results in negative, the routine comes to an end.

In step 306, the transmission controller 200 inputs time to determine the start of a current pulse $t_n$ in a train of the pulse signal R, see FIG. 7, and stores the result at the most significant location, namely $t_n$, in a third shift register. The third shift register has, in addition to the most significant location $t_n$, one less significant location, namely $t_{n-1}$, and can shift to the right in the direction from the most significant location $t_n$ toward the least significant location $t_{n-1}$. Storing new data into the most significant location $t_n$ causes movement of the stored data to the least significant location and causes the stored data at the least significant location $t_{n-1}$ to overflow.

In step 308, the transmission controller 200 inputs the stored data at the location $t_{n-1}$ in the third shift register. In step 310, the transmission controller 200 inputs current speed ratio i established in the transmission 4. In step 312, the transmission controller 200 subtracts the input data $t_{n-1}$ from the input data $t_n$ to store the result as T(1)n.

In step 314, the transmission controller 200 divides the data T(1)n by the speed ratio i to store the result as Ttn. The data Ttn is indicative of a period that is the time from the start of one pulse to the start of the last pulse in a train of the pulse signal $R_T$ of the turbine speed sensor 20 (see FIG. 1).

In step 316, the transmission controller 200 determines whether the period Ttn is greater than or equal to a reference $Tt_0$. If the interrogation in step 316 results in affirmative, the transmission controller 200 increases, in step 318, the content of counter N by one. In the next step 320, the transmission controller 200 determines whether or not the content of counter N is greater than or equal to a predetermined number n. If the interrogation in step 316 results in negative, the transmission controller sets, in step 324, the content to counter N equal to zero.

If the interrogation in step 320 results in affirmative, the transmission controller 200 outputs lock-up release command in step 322.

After the negative flow of the step 320, step 322 or step 324, the routine comes to an end.

From the preceding description of the preferred implementation of the present invention, it is now be understood that the deceleration dependent lock-up release command generator develops the lock-up release command in response to the magnitude of deceleration, which the output shaft 5 of the transmission 4 is subject to. It is also understood that the torque converter speed dependent second lock-up release command generator develops the lock-up release command in response to rotational speed of the output element of the torque converter 1.

Referring to FIG. 9, it will now be seen that the deceleration dependent lock-up release command generator gains authority to take over the lock-up release control when the magnitude of deceleration is greater than or equal to a predetermined magnitude $G_x$. The torque converter speed dependent lock-up release command generator gains authority to take over the lock-up release control when the magnitude of deceleration is less than the predetermined magnitude $G_x$.

The content of disclosure of Japanese Patent Application No. 10-46772 (filed Feb. 27, 1998) is hereby incorporated by reference in its entirety.

The above-described implementation of the present invention is an example implementation. Moreover various modifications to the present invention may occur to those skilled in the art and will fall within the scope of the present invention as set forth below.

What is claimed is:

1. A lock-up control system for a vehicle drivetrain with a foot brake pedal and a torque converter situated between an engine and a transmission, the torque converter having an input element connected to the engine and an output element as a torque delivery element to the transmission, the transmission having torque delivery elements including an output shaft, the lock-up control system comprising:

a lock-up clutch operative to interconnect the input and output elements of the torque converter when engaged;

a lock-up clutch control arrangement operative to release said lock-up clutch in response to a lock-up release command;

a deceleration dependent lock-up release command generator operative to develop said lock-up release command in response to the magnitude of deceleration, which one of the torque delivery elements of the transmission is subject to;

a torque converter speed dependent second lock-up release command generator operative to develop said lock-up release command in response to rotational speed of the output element of the torque converter; and a brake sensor generating a brake signal in response to operator depression of the foot brake pedal;

wherein at least one of said lock-up release command generators are selectively rendered operative in response to said brake signal.

2. The lock-up control system as claimed in claim 1, wherein said torque converter speed dependent generator includes a counter, which is triggered to increase the content thereof by one whenever rotational speed of the output element of the torque converter is greater than or equal to a predetermined reference, and generates said lock-up release command when the content of said counter is greater than or equal to a predetermined number.

3. The lock-up control system as claimed in claim 1, further comprising:

a speed sensor generating a pulse signal in response to rotation of the output shaft of the transmission;

wherein said deceleration dependent lock-up release command generator is operative to input information as to rotational speed of the output shaft from said pulse signal.

4. The lock-up control system as claimed in claim 1, further comprising:

a speed sensor generating a pulse signal in response to rotation of a predetermined one of the torque delivery elements;

wherein said torque converter speed dependent lock-up release command generator is operative to input information as to rotational speed of the predetermined one torque delivery element from said pulse signal.

5. The lock-up control system as claimed in claim 1, further comprising:

a speed sensor generating a pulse signal in response to rotation of the output shaft of the transmission;

wherein said deceleration dependent and torque converter dependent lock-up release command generators input information as to rotational speed of the output shaft from said pulse signal.

6. The lock-up control system as claimed in claim 1, wherein;

said deceleration dependent lock-up release command generator is operative to calculate the instantaneous magnitude of deceleration at intervals and determine the value of a predetermined references a predetermined function of the calculated instantaneous magnitude of deceleration upon calculation of the instantaneous magnitude of deceleration; and said deceleration dependent lock-up release command generator is operative to determine whether or not the calculated instantaneous magnitude of deceleration is greater than or equal to said predetermined reference.

7. A lock-up control system for a vehicle drivetrain with a foot brake pedal and a torque converter situated between an engine and a transmission, the torque converter having an input element connected to the engine and an output element as a torque delivery element to the transmission, the transmission having torque delivery elements including an output shaft, the lock-up control system comprising:

a lock-up clutch operative to interconnect the input and output elements of the torque converter when engaged;

a lock-up clutch control arrangement operative to release said lock-up clutch in response to a lock-up release command;

a deceleration dependent lock-up release command generator operative to develop said lock-up release command in response to the magnitude of deceleration, which one of the torque delivery elements of the transmission is subject to; and a torque converter speed dependent second lock-up release command generator operative to develop said lock-up release command in response to rotational speed of the output element of the torque converter;

wherein said torque converter speed dependent generator includes a counter, which is triggered to increase the content thereof by one whenever rotational speed of the output element of the torque converter is greater than or equal to a predetermined reference, and generates said lock-up release command when the content of said counter is greater than or equal to a predetermined number.

8. A lock-up control system for a vehicle drivetrain with a foot brake pedal and a torque converter situated between an engine and a transmission, the torque converter having an input element connected to the engine and an output element as a torque delivery element to the transmission, the transmission having torque delivery elements including an output shaft, the lock-up control system comprising:

a lock-up clutch operative to interconnect the input and output elements of the torque converter when engaged;

a lock-up clutch control arrangement operative to release said lock-up clutch in response to a lock-up release command;

a deceleration dependent lock-up release command generator operative to develop said lock-up release command in response to the magnitude of deceleration, which one of the torque delivery elements of the transmission is subject to;

a torque converter speed dependent second lock-up release command generator operative to develop said lock-up release command in response to rotational speed of the output element of the torque converter; and a speed sensor generating a pulse signal in response to rotation of the output shaft of the transmission;

wherein said deceleration dependent lock-up release command generator is operative to input information as to rotational speed of the output shaft from said pulse signal.

9. A lock-up control system for a vehicle drivetrain with a foot brake pedal and a torque converter situated between an engine and a transmission, the torque converter having an input element connected to the engine and an output element as a torque delivery element to the transmission, the transmission having torque delivery elements including an output shaft, the lock-up control system comprising:

a lock-up clutch operative to interconnect the input and output elements of the torque converter when engaged;

a lock-up clutch control arrangement operative to release said lock-up clutch in response to a lock-up release command;

a deceleration dependent lock-up release command generator operative to develop said lock-up release command in response to the magnitude of deceleration, which one of the torque delivery elements of the transmission is subject to;

a torque converter speed dependent second lock-up release command generator operative to develop said lock-up release command in response to rotational speed of the output element of the torque converter; and a speed sensor generating a pulse signal in response to rotation of a predetermined one of the torque delivery elements;

wherein said torque converter speed dependent lock-up release command generator is operative to input information as to rotational speed of the predetermined one torque delivery element from said pulse signal.

10. A lock-up control system for a vehicle drivetrain with a foot brake pedal and a torque converter situated between an engine and a transmission, the torque converter having an input element connected to the engine and an output element as a torque delivery element to the transmission, the transmission having torque delivery elements including an output shaft, the lock-up control system comprising:

a lock-up clutch operative to interconnect the input and output elements of the torque converter when engaged;

a lock-up clutch control arrangement operative to release said lock-up clutch in response to a lock-up release command;

a deceleration dependent lock-up release command generator operative to develop said lock-up release command in response to the magnitude of deceleration, which one of the torque delivery elements of the transmission is subject to;

a torque converter speed dependent second lock-up release command generator operative to develop said lock-up release command in response to rotational speed of the output element of the torque converter; and a speed sensor generating a pulse signal in response to rotation of the output shaft of the transmission;

wherein said deceleration dependent and torque converter dependent lock-up release command generators input information as to rotational speed of the output shaft from said pulse signal.

11. The lock-up control system as claimed in claim 10, wherein said deceleration dependent lock-up release command generator is operative to calculate, as a period, the time from the start of one pulse to the start of one before the last pulse in a train of said pulse signal.

12. The lock-up control system as claimed in claim 10, wherein said torque converter speed dependent lock-up release command generator is operative to calculate, as a period, the time from the start of one pulse to the start of the last pulse in a train of said pulse signal.

13. The lock-up control system as claimed in claim 10, wherein said torque converter speed dependent lock-up release command generator is operative to input information as to current speed ratio established in the transmission and calculate rotational speed of the output element of the torque converter from the rotational speed of the output shaft and the current speed ratio.

14. The lock-up control system as claimed in claim 13, wherein said torque converter speed dependent lock-up release command generator is operative to determine, at intervals, whether or not the rotational speed of the output element of the torque converter is greater than or equal to a predetermined reference;

said torque converter speed dependent lock-up release command generator includes a counter, which is triggered to increase the content thereof by one whenever it is determined that the rotational speed of the output element of the torque converter is greater than or equal to a predetermined reference; and said torque converter speed dependent lock-up release command generator is operative to generate said lock-up release command when the content of said counter is greater than or equal to a predetermined number.

15. The lock-up control system as claimed in claim 10, wherein said deceleration dependent lock-up release command generator is operative to calculate, as a period, the time from the start of one pulse to the start of two before the last pulse in a train of said pulse signal.

16. The lock-up control system as claimed in claim 15, wherein said deceleration dependent lock-up release command generator is operative to calculate, as the magnitude of deceleration, a difference between the current period and the preceding period before the last period.

17. The lock-up control system as claimed in claim 16, wherein said deceleration dependent lock-up release command generator includes a look-up table containing various values of said predetermined reference against various values of said period; and said deceleration dependent lock-up release command generator is operative to perform a table look-up operation of said look-up table using the period upon being calculated to update said predetermined reference.

18. The lock-up control system as claimed in claim 17, wherein said deceleration dependent lock-up release command generator is operative to determine whether said difference between the current period and the preceding period before the last is greater than or equal to said predetermined reference.

19. A lock-up control system for a vehicle drivetrain with a foot brake pedal and a torque converter situated between an engine and a transmission, the torque converter having an input element connected to the engine and an output element as a torque delivery element to the transmission, the transmission having torque delivery elements including an output shaft, the lock-up control system comprising:

a lock-up clutch operative to interconnect the input and output elements of the torque converter when engaged;

a lock-up clutch control arrangement operative to release said lock-up clutch in response to a lock-up release command;

a deceleration dependent lock-up release command generator operative to develop said lock-up release command in response to the magnitude of deceleration, which one of the torque delivery elements of the transmission is subject to; and a torque converter speed dependent second lock-up release command generator operative to develop said lock-up release command in response to rotational speed of the output element of the torque converter;

wherein said deceleration dependent lock-up release command generator is operative to calculate the instantaneous magnitude of deceleration at intervals and determine the value of a predetermined reference as a predetermined function of the calculated instantaneous magnitude of deceleration upon calculation of the instantaneous magnitude of deceleration; and wherein said deceleration dependent lock-up release command generator is operative to determine whether or not the calculated instantaneous magnitude of deceleration is greater than or equal to said predetermined reference.

20. The lock-up control system as claimed in claim 19, wherein said deceleration dependent lock-up release command generator includes a counter, which is triggered to increase the content thereof by one whenever it is determined that the calculated instantaneous magnitude of deceleration is greater than or equal to said predetermined reference.

21. The lock-up control system as claimed in claim 20, wherein said deceleration dependent lock-up release command generator is operative to generate said lock-up release command when the content of said counter is greater than or equal to a predetermined number.

* * * * *